J. L. DAY.
AUTOMOBILE LOCK.
APPLICATION FILED SEPT. 16, 1918.
1,293,362.
Patented Feb. 4, 1919.
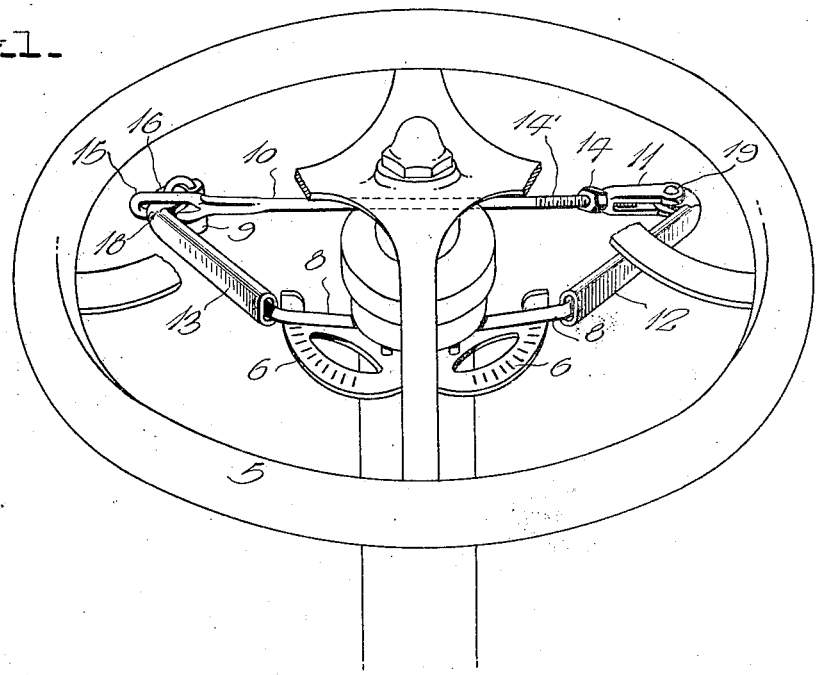
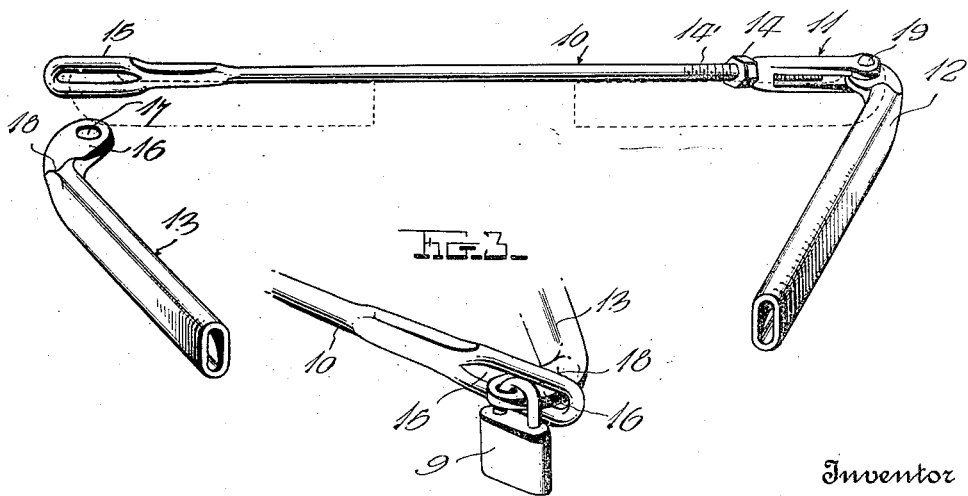
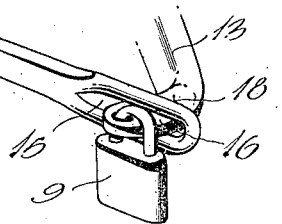
Witness
H. Woodard
Inventor
Joseph L. Day
By H. B. Willson & Co.
Attorneys

UNITED STATES PATENT OFFICE.

JOSEPH L. DAY, OF NASH, OKLAHOMA.

AUTOMOBILE-LOCK.

1,293,362.  Specification of Letters Patent.  Patented Feb. 4, 1919.

Application filed September 16, 1918. Serial No. 254,319.

*To all whom it may concern:*

Be it known that I, JOSEPH L. DAY, a citizen of the United States, residing at Nash, in the county of Grant and State of Oklahoma, have invented certain new and useful Improvements in Automobile-Locks; and I do declare the following to be a full, clear, and exact description of the invention, such as will enable others skilled in the art to which it appertains to make and use the same.

This invention relates to automobile locks, and it relates more specifically to an improved lock for the spark and throttle controlling levers of an automobile of known construction.

One object of this invention is to provide a device of this character which is especially applicable to Ford automobiles and which is capable of being adjusted to fit other makes of automobiles.

Another object is to provide a lock of this character which is strong, durable, convenient, and capable of being manufactured at a low cost.

Other objects and advantages may become apparent to persons who read the following details of construction in connection with the accompanying drawings in which—

Figure 1 illustrates my improved locking device applied to a Ford steering device, viewed from the rear;

Fig. 2 is a view illustrating in perspective two of the separable elements of my improved locking device, the same being shown folded in dotted lines; and, Fig. 3 is a perspective view showing the said separable parts locked together by means of a pad lock.

Referring to these drawings in detail, in which similar reference characters correspond with similar parts throughout the several views, the steering wheel 5, quadrants 6, spark-controlling lever and throttle-controlling lever 8 are of the ordinary Ford construction and will not be further described in detail. The pad lock 9 may also be of ordinary construction, and is not described and claimed specifically. The device which constitutes my invention consists of a rod 10, a bifurcated member 11, tubular members 12 and 13, a lock nut 14, and the combination of these elements with the levers 8.

The rod 10 is formed with screw threads 14′ at one end and with a loop or opening 15 at its other end, the latter being relatively long and narrow so as to receive a flat apertured end portion 16 of the tubular member 13. This flattened end portion extends laterally of the main portion of the tubular member so that said main portion may lie parallel with and against the body of the rod 10 when the end portion 16 is through the opening 15 and engaged by the lock 9, said lock having its bail through the aperture 17. The tubular member 13 is preferably oval in cross section with the exception of the flattened portion 16 and a shoulder 18 at the junction of the end portion 16 with the main body.

The tubular member 12 is also formed with a flattened end portion which is turned laterally and apertured to receive a rivet 19. The aperture through which the rivet extends may be somewhat smaller than the aperture 17, but the tubular members 12 and 13 may be exactly alike in all other respects. The apertured end portion of the member 12 extends between the substantially parallel arms or furcations of the member 11, and this member is provided with an internally screw-threaded portion which communicates with the space between the furcations and receives the threaded portions 14′ of the rod 10. It will be seen, therefore, that the distance between the tubular members 12 and 13 may be adjusted by loosening the lock nut 14, turning the rod 10 with relation to the member 11 until the desired adjustment is obtained and then tightening the lock nut.

In applying this locking member to the spark and throttle controlling members, either of the tubular members 12 and 13 may be caused to receive either the spark or throttle controlling lever, while the rod 10 and tubular member 13 are disconnected, and the apertured end portion 16 of the tubular member 13 is then passed through the opening 15, and caused to receive the pad lock 9. Obviously, the pad lock secures the members 10 and 13 together, and the middle portion of the rod 10 bears against the upper end of the steering shaft on which the wheel 5 is mounted, thereby effectually locking the spark and throttle controlling levers.

Although I have described this embodiment of my invention very specifically, it is not intended to limit my invention to these exact details of construction and arrangement of parts, but I am entitled to make changes without departing from the inventive idea disclosed in the foregoing description and following claims.

What I claim as my invention is:

1. In a locking device engageable with the spark-controlling lever and throttle-controlling lever of an automobile, a rod having an opening through one end and screw threads on its other end, a tubular member having an apertured end adapted to be moved into and out of the aperture of said rod, a lock movable into and out of engagement with the apertured end of said tubular member, a bifurcated and internally threaded member adjustably engaged with the threaded end of said rod, means to secure said bifurcated member in its adjusted positions on said rod, and a tubular member pivotally connected between the furcations of said bifurcated member.

2. In a locking device engageable with the spark-controlling lever and throttle-controlling lever of an automobile, a rod having an opening through one end and screw threads on its other end, a tubular member having an apertured end adapted to be moved into and out of the aperture of said rod, a lock movable into and out of engagement with the apertured end of said tubular member, a bifurcated and internally threaded member adjustably engaged with the threaded end of said rod, means to secure said bifurcated member in its adjusted positions on said rod, and a tubular member having an apertured end pivotally connected between the furcations of said bifurcated member, the apertured end of each of said tubular members extending laterally so that these tubular members can be folded into parallel and juxtaposed relation to said rod and bifurcated member while engaged therewith.

In testimony whereof I have hereunto set my hand.

JOSEPH L. DAY.

Copies of this patent may be obtained for five cents each, by addressing the "Commissioner of Patents, Washington, D. C."